(12) United States Patent
Kahl

(10) Patent No.: US 7,992,487 B1
(45) Date of Patent: Aug. 9, 2011

(54) ONE-STEP CANNING KETTLE AND ASSOCIATED METHOD

(76) Inventor: Alison J. Kahl, Merced, CA (US)

(*) Notice: Subject to any disclaimer, the term of this patent is extended or adjusted under 35 U.S.C. 154(b) by 420 days.

(21) Appl. No.: 12/069,549

(22) Filed: Feb. 11, 2008

(51) Int. Cl.
*A47J 31/00* (2006.01)

(52) U.S. Cl. ...... 99/275; 99/323.3; 222/466; 222/475.1; 222/562; 222/566; 239/377; 239/378; 239/397; 220/592.16

(58) Field of Classification Search ......... 99/275–323.1, 99/326–333, 485, 467, 375, 323.3; 220/912, 220/592.16, 504; 219/432–442; 222/475.1, 222/470, 466, 477, 481, 531, 537, 562, 567, 222/568, 566; 239/377, 378, 390, 391, 392, 239/397, 376
See application file for complete search history.

(56) References Cited

U.S. PATENT DOCUMENTS

| | | | | |
|---|---|---|---|---|
| 245,194 | A | * | 8/1881 | McIntosh ............ 239/377 |
| 453,530 | A | * | 6/1891 | Baker ............ 239/377 |
| 542,825 | A | * | 7/1895 | Hannigan et al. ......... 239/391 |
| 1,823,276 | A | * | 9/1931 | Lucius ............ 222/573 |
| 1,893,628 | A | * | 1/1933 | Marsden ........... 222/466 |
| 3,353,725 | A | * | 11/1967 | Caceres ........... 222/456 |
| 3,973,480 | A | | 8/1976 | Andersen |
| 4,051,972 | A | | 10/1977 | Botkin |
| 4,234,783 | A | * | 11/1980 | Aoshima ............ 219/441 |
| 4,332,826 | A | | 6/1982 | Beauvais et al. |
| 4,346,836 | A | | 8/1982 | Nagel |
| 4,401,681 | A | | 8/1983 | Dahle |
| 4,409,454 | A | | 10/1983 | Beauvais et al. |
| 4,441,016 | A | * | 4/1984 | Oota et al. ............ 219/441 |
| 4,546,005 | A | | 10/1985 | Vongeheur |
| 5,041,297 | A | | 8/1991 | Dowaliby |
| 6,082,248 | A | * | 7/2000 | Turrel ............ 99/323.9 |
| 6,302,336 | B1 | * | 10/2001 | Brown et al. .......... 239/377 |
| 6,565,903 | B2 | * | 5/2003 | Ng et al. ............ 426/233 |
| 2005/0189355 | A1 | * | 9/2005 | Manke ............ 220/304 |

* cited by examiner

*Primary Examiner* — Reginald L Alexander
(74) *Attorney, Agent, or Firm* — Montgomery Patent and Design; Robert C. Montgomery; Joseph T Yaksick

(57) ABSTRACT

The invention as presently conceived discloses a cooking kettle apparatus having special features to make food canning a single step process. The apparatus comprises a large diameter pour spout on the upper portion of the kettle that allows even the thickest food to flow through, and a series of interchangeable spout attachments. One spout attachment is a strainer to hold back solids as the cooked product is poured into containers. Another attachment is a straight pour spout with an air induction vent to improve the flow or liquids. The kettle has three handles about the upper portion to allow easy pouring by one person, or for two people when there is a particularly heavy batch of cooked food. The method of use provides a means by which a person can cook jams, jellies, and similar foods in the most efficient manner and with less specialized cooking items.

8 Claims, 6 Drawing Sheets

ONE-STEP CANNING KETTLE AND ASSOCIATED METHOD

RELATED APPLICATIONS

The present invention was first described in and claims the benefit of Disclosure Document No. 609,988 on Dec. 7, 2006.

FIELD OF THE INVENTION

This invention pertains to a novel cooking apparatus for use in home canning. The apparatus is a cooking kettle with an integrated spout capable of maintaining different types of spout attachments.

BACKGROUND OF THE INVENTION

Home canning is popular for varied reasons. Some prefer the improved taste that comes from canning one's own food. Others are conscious of the harmful additives and the possibility of contamination which seems to be prevalent as of late. Some enjoy the economic benefits and/or find a sense of fulfillment in canning. Regardless of the motivation, every person who has canned their own food is aware of the difficulties that can occur in the process.

Traditionally, when one cans, it is necessary to heat whatever food product is to be canned to a certain temperature and add whatever ingredients are necessary for preservation. After the food material is warmed to the appropriate temperature, the food material is then strained (if the canning recipe calls for this) or other dispensed into the canning jars. This is usually accomplished utilizing a strainer and a funnel. Once the jars are filled and the prescribed head space is allowed, the jars are placed into the canner for either hot water or pressure canning.

The traditional method presents difficulties that can thwart the efforts of a canner. Transferring material from the cooking vessel to the jars can expose the food material to microorganisms that can spoil or cause sickness. The transfer can also reduce the temperature of the food material making it more likely that a microorganism could survive the temperature. The transfer also presents a significant risk of splatter from the hot food material which could burn or otherwise injure the home canner. The transfer also increases the preparation time involved in the process in clean-up of additional kitchen utensils.

It is highly desirable to discover a means and apparatus to eliminate the possibility of the negative effects involved in the transfer of hot food materials to the canning jars.

U.S. Pat. No. 5,041,297 issued to Dowaliby discloses an apparatus and method for canning food products. This patent does not appear to disclose an apparatus that is capable of preparing the item to be canned by cooking and easily dispersing said item through selectable spout attachments into canning containers.

U.S. Pat. No. 4,409,454 issued to Beauvois discloses a microwave canning apparatus. This patent does not appear to disclose an apparatus that is capable of preparing the item to be canned by cooking and easily dispersing said item through selectable spout attachments into canning containers.

U.S. Pat. No. 4,346,836 issued to Nagel discloses a pressure cooker canning unit. This patent does not appear to disclose an apparatus that is capable of preparing the item to be canned by cooking and easily dispersing said item through selectable spout attachments into canning containers.

U.S. Pat. No. 4,332,826 issued to Beauvais discloses a method for canning food products. This patent does not appear to disclose an apparatus that is capable of preparing the item to be canned by cooking and easily dispersing said item through selectable spout attachments into canning containers.

U.S. Pat. No. 3,973,480 issued to Andersen discloses an apparatus for canning food. This patent does not appear to disclose an apparatus that is capable of preparing the item to be canned by cooking and easily dispersing said item through selectable spout attachments into canning containers.

SUMMARY OF THE INVENTION

In view of the foregoing disadvantages inherent in the prior art, it has been observed that there is need for an apparatus that is specifically designed and constructed to reduce the steps necessary for the canning of food and decrease the likelihood of contamination and user injury.

The one-step canning kettle provides a convenient and safe way to transfer cooked materials from the pot to the canning jars.

The one-step canning kettle eliminates the need to have a separate funnel and cooking pot and reduces the potential for burns for the user from splattered or spilled material.

The one-step canning kettle is constructed of durable materials commonly found in kitchen pots and pans and possessing break resistance, high toughness properties and the capability of functioning in a high temperature range.

The one-step canning kettle may be manufactured in a plurality of dimensions to accommodate various kitchen and/or cooking operations.

The one-step canning kettle comprises a kettle device, a spout system, a first body handle, a pair of second body handles, a lid with a lid handle and a locking device.

The one-step canning kettle possesses a kettle device capable of withstanding high temperatures and ergonomically designed, in a variety of sizes and shapes, to contain a vast amount of material for cooking.

The one-step canning kettle defines an interior compartment with an open front face leading to a spout.

The one-step canning kettle possesses a lid which may be either a friction or threaded fit to the kettle.

The one-step canning kettle lid possesses a sealing means, such as but not limited to a rubberized gasket to sealably engage the kettle.

The one-step canning kettle provides a three body handles which are positioned in both a vertical and horizontal orientation to permit a plurality of pouring and/or transportation options.

The one-step canning kettle handles are constructed any durable material with high temperature resistant coating such as but not limited to, plastic or a rubberized compound.

The one-step canning kettle possesses a locking mechanism for the lid that secures the lid to the kettle.

The one-step canning kettle locking mechanism comprises a clip which is pivotably mounted to the lid and engages a locking ear attached to the upper portion of the kettle.

The one-step canning kettle locking mechanism provides not only for releasable engagement between the kettle and the lid but also restrains movement of the lid and kettle during heating and cooking.

The one-step canning kettle provides a spout system for the convenient dispersal of cooked materials from the kettle.

The one-step canning kettle spout system is comprised of a spout and three selectable spout attachments.

The one-step canning kettle spout is elongated, located on the front of the kettle and possesses a conduit in connection with the interior compartment of the kettle.

The one-step canning kettle spout system provides three selectable spout attachments that permit the user to perform different operational tasks, such as but not limited to straining or permitting steam to escape.

The one-step canning kettle spout system provides the user with the capability top control the dispersal of material from the kettle.

The one-step canning kettle selectable spout attachment is threadably attached to the spout via a threaded groove located at the dispersal end of the spout.

The prior art appears to disclose apparatuses which provide for the canning of goods. The prior art does not appear to disclose an apparatus that provides for the convenient, one-step, safe dispensing of cooked material from the cooking vessel to the canning jars.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| | |
|---|---|
| 10 | one-step canning kettle |
| 20 | kettle |
| 25 | interior |
| 30 | lid |
| 35 | gasket |
| 40 | lid handle |
| 45 | first body handle |
| 46 | second body handle |
| 50 | spout |
| 52 | dispersing end |
| 53 | receiving end |
| 55 | interior conduit |
| 60 | clip |
| 65 | locking ear |
| 70 | strainer spout attachment |
| 72 | outer wall |
| 75 | threaded region |
| 77 | aperture |
| 78 | air induction vent |
| 80 | air induction spout attachment |
| 90 | mesh spout attachment |

DETAILED DESCRIPTION OF THE PREFERRED EMBODIMENT

Figure 4:
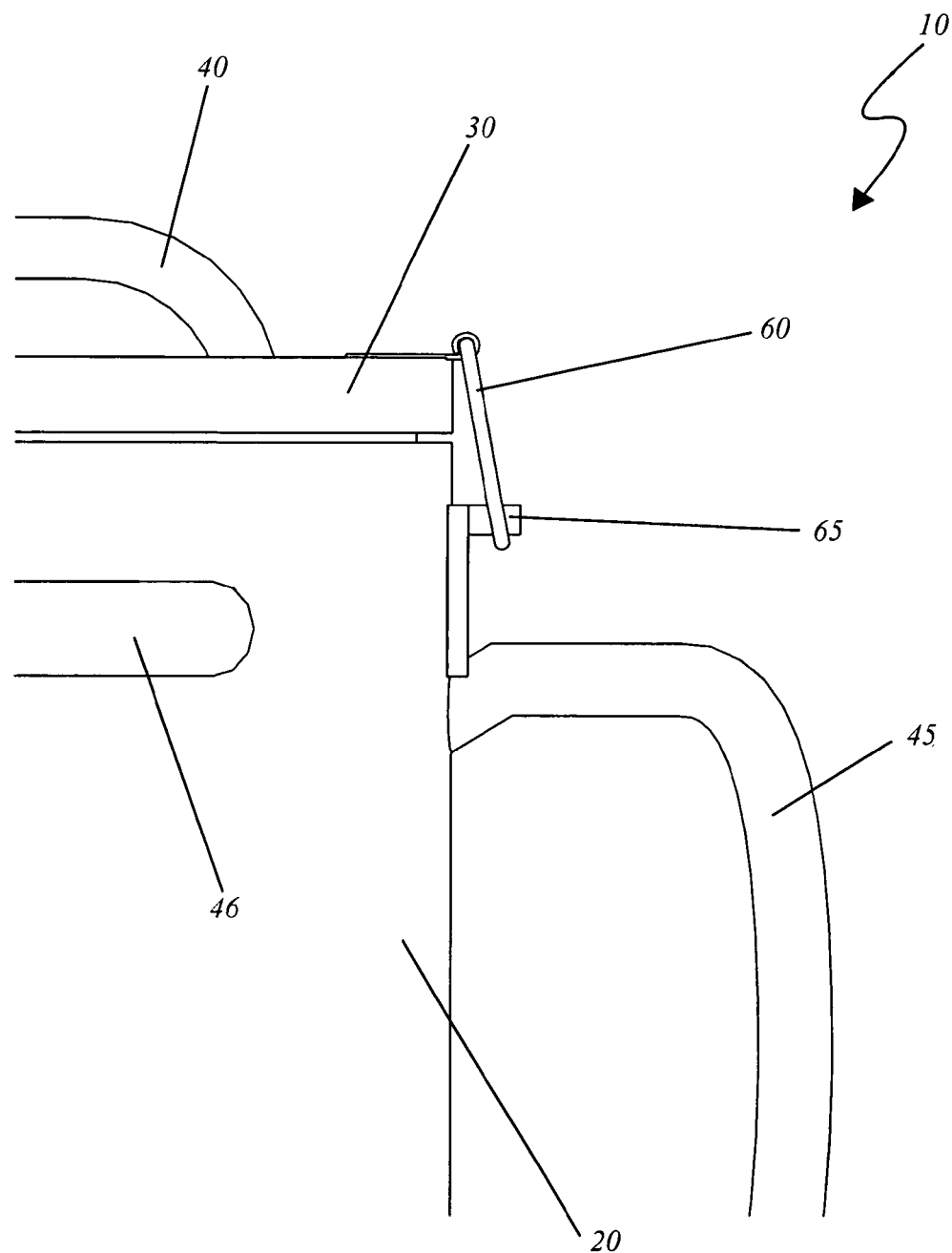
FIG. 4 is a close-up view of a locking mechanism 60, 65 releasably locking a lid 30 onto the upper extremities of a kettle device 20, according to the preferred embodiment of the present invention.
Figure 5:
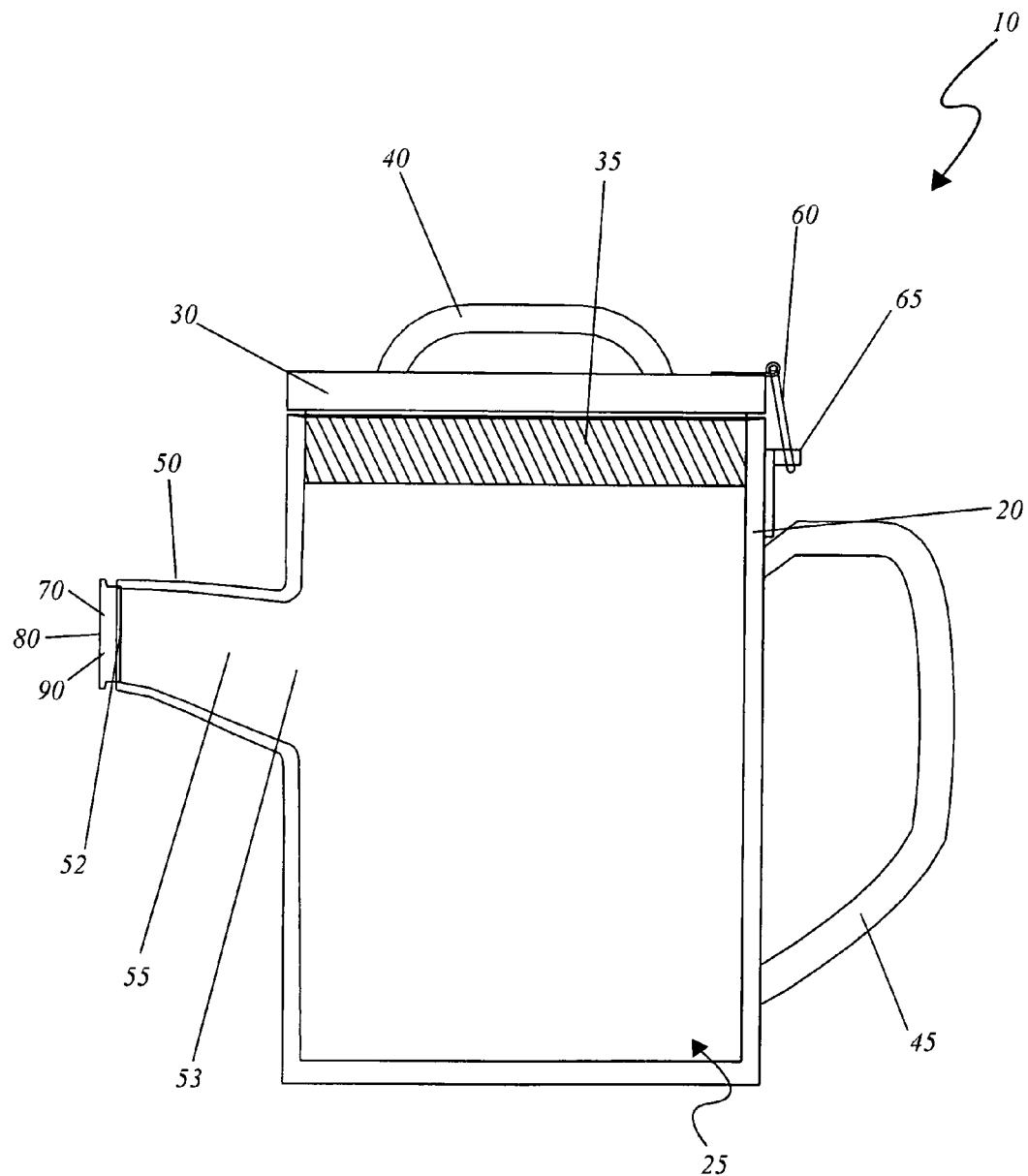
FIG. 5 is a side view of the one-step canning kettle 10, according to the preferred embodiment of the present invention.
Figure 6C:
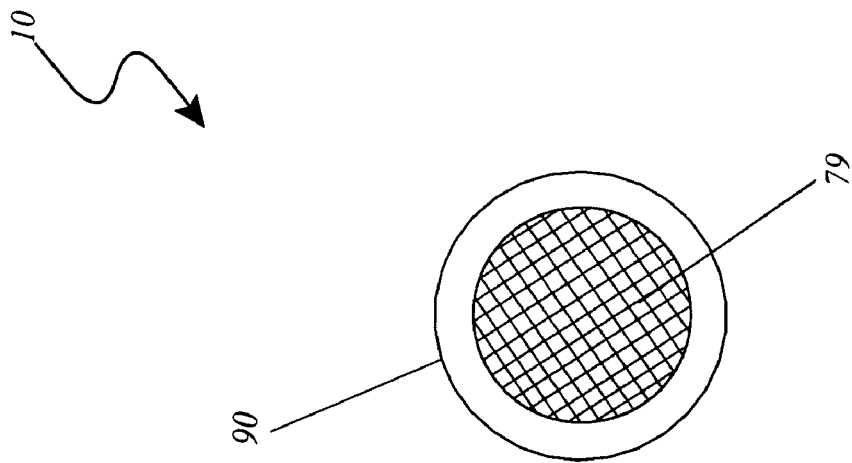
FIG. 6a is a front view of a plurality of spout attachments 70, according to the preferred embodiment of the present invention.
FIG. 6b is a front view of a plurality of air induction spout attachment 80, according to an alternate embodiment of the present invention; and, FIG. 6c is a front view of a mesh spout attachment 90, according to an alternate embodiment of the present invention.
Figure 6B:
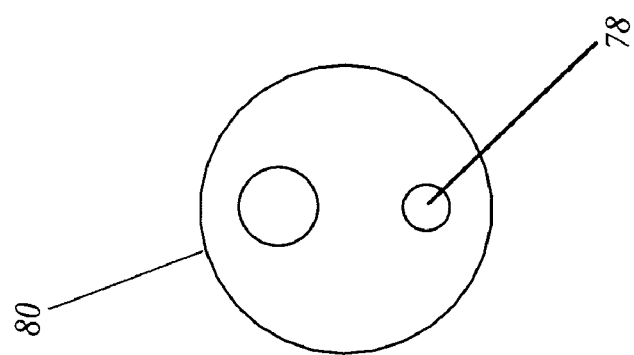

The best mode for carrying out the invention is presented in terms of its preferred embodiment, herein depicted within FIGS. 1 through 6a, with alternate embodiments in FIGS. 6b and 6c. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an apparatus and method that discloses a cooking kettle 20 comprising additional features such to allow food canning, food preparation, and cooking in a one (1) step process. The one-step canning kettle (herein described as the "apparatus") 10 comprises a kettle device 20, a spout system 50, a first body handle 45, a pair of second body handles 46, a lid 30, a lid handle 40 and a locking device 60, 65. The apparatus 10 is envisioned to be introduced in a plurality of dimensions to accommodate various kitchen and/or cooking operations of a plurality of sizes and complexities. The apparatus 10 is envisioned to be fabricated of metallic substances, and/or other durable materials that are found in most common pots and/or pans that are break resistance, high toughness properties, and the capability of functioning in a wide temperature range. Special molds and/or dies would be necessary to provide for the specialized shape and functions.

Figure 1:
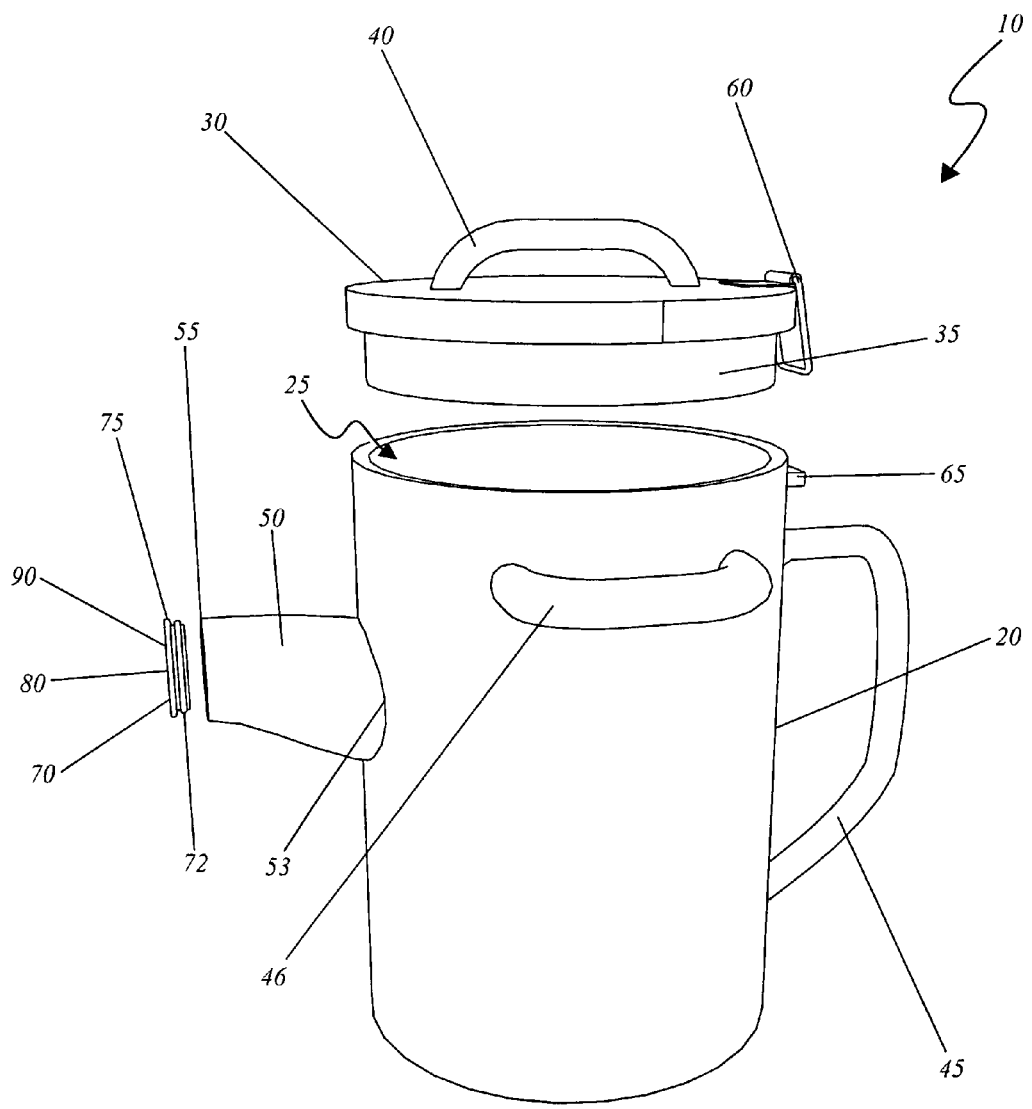
FIG. 1 is a perspective view of one-step canning kettle 10 with a lid 30 and spout attachment 70 attachably removed therefrom, according to the preferred embodiment of the present invention.

Referring now to FIG. 1, a perspective view of the apparatus 10 is disclosed in accordance with the present invention. The apparatus 10 comprises a kettle device 20 capable of withstanding high temperatures ergonomically designed and shaped much like a vessel with a height sufficient to contain vast amount of fluids, food, preparation, and the like (herein described as the "contents"). The size and shape of the kettle 20 is envisioned to vary in accordance with user preference. The kettle 20 is envisioned to be of sufficient size to permit a plurality and variety of contents to be disposed within said kettle 20. The apparatus 10 cooks, prepares, and/or stores contents within the inside of the kettle 20 defining the interior 25. The kettle 20 defines an interior compartment 25 for cooking and/or housing contents, generally in a same configuration as the exterior profile of the kettle 20 with an open front face leading toward a spout 50.

Figure 2:
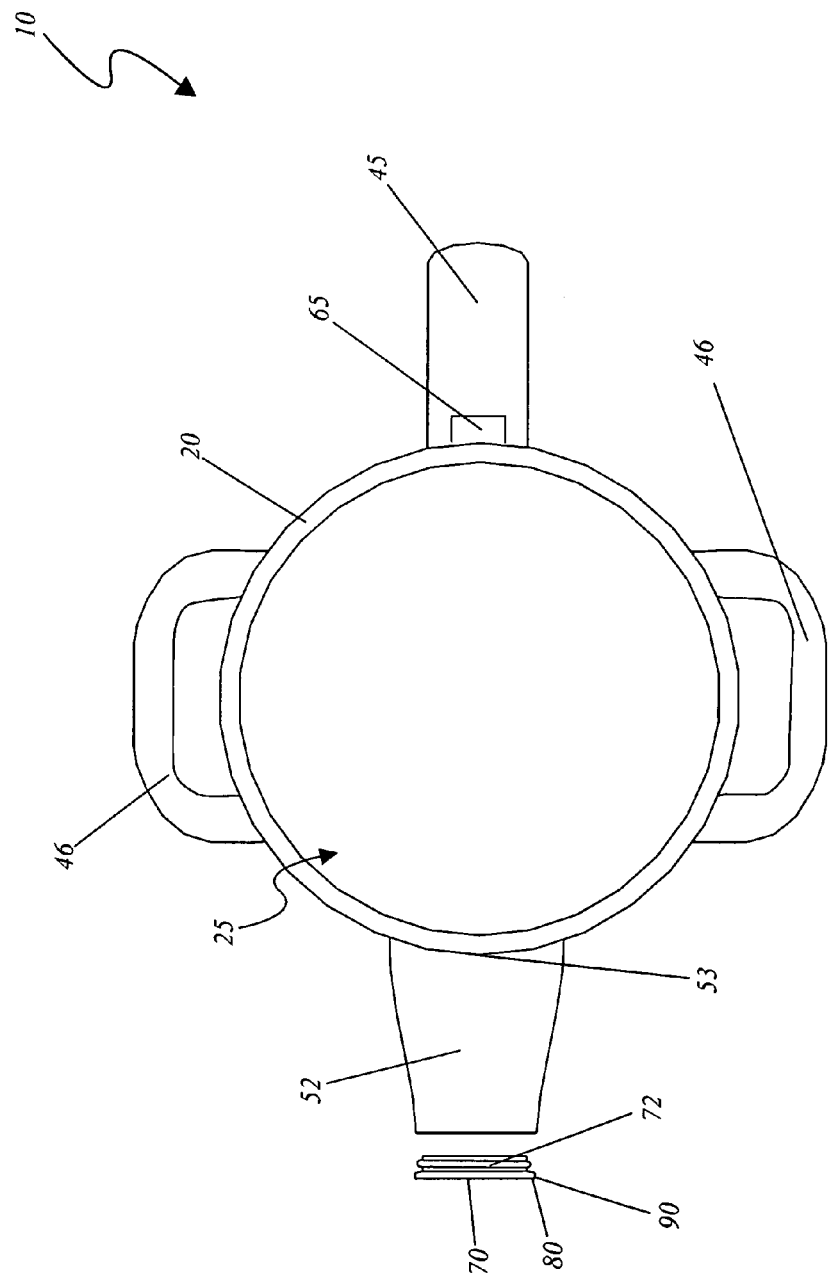
FIG. 2 is a top view of a kettle device 20, according to the preferred embodiment of the present invention.
Figure 3:
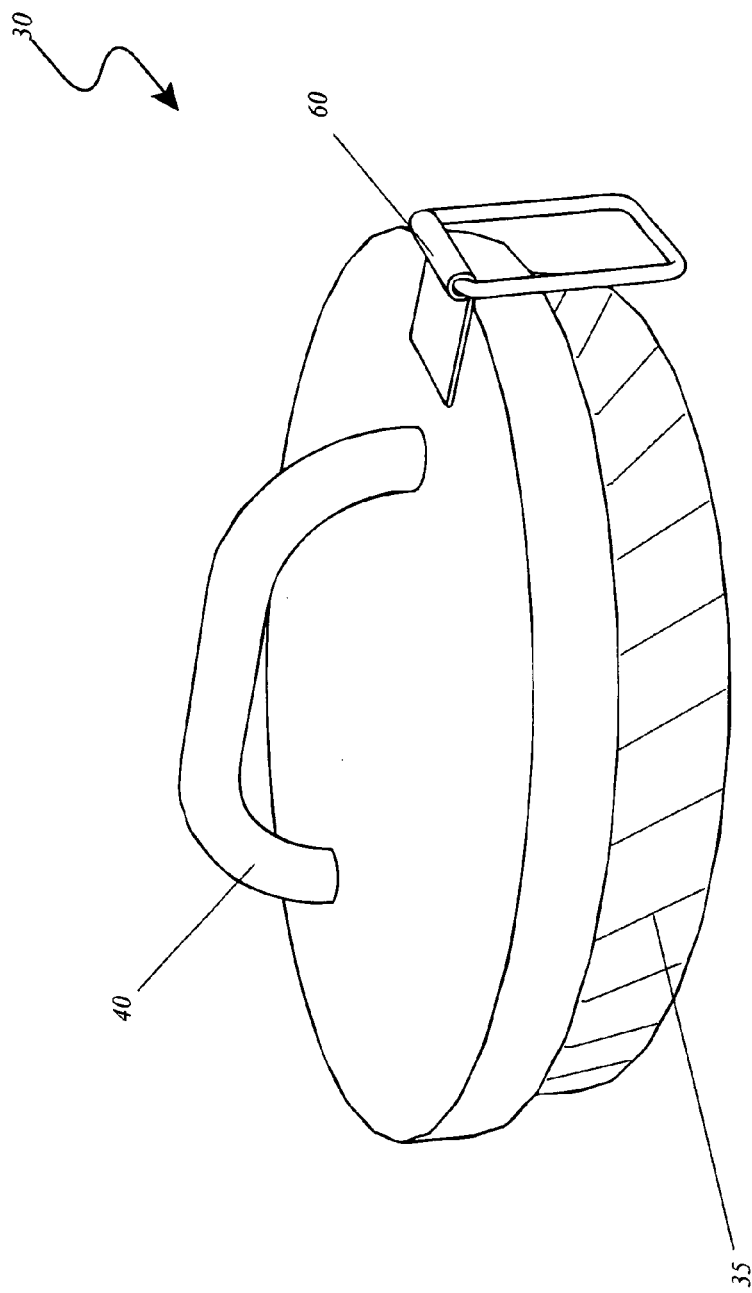
FIG. 3 is a perspective view of a lid 30, according to the preferred embodiment of the present invention.

Referring now to FIGS. 2 and 3, a top view of the kettle device 20 and a perspective view of the lid 30, is disclosed in accordance with the preferred embodiment of the present invention. The top portion of the kettle 20 is envisioned to comprise a means to receive a rubberized gasket 35 or the like. A lid 30 is provided for closing the upper portion of the kettle 20 via the gasket 35 which sealably engages the upper interior 25 extremities. The lid 30 could be threaded or could be simply a friction fit on the kettle 20. Thus, the kettle 20 is completely closed and is provided with a plurality of body handles 45, 46 thereon for placing it on and removing therefrom a heated platform. The lid 30 includes a handle 40 of any convenient configuration attached thereto, to carry the apparatus 10 or just the lid 30 from place to place. The kettle 20 has three (3) body handles 45, 46 positioned in both vertical 45 and horizontal 46 orientations about the upper portion to permit a plurality of options to user to pour and/or carry the apparatus 10. Each handle 45, 46 comprises a "C"-shaped contour with two (2) ends securely fastened in a suitable manner thereto the lid 30 and the kettle 20, protruding outwardly therefrom. Some or all of the handles 45, 46 may comprise a high temperature resistant plastic or rubberized coating thereon to further prevent and safeguard the user from burns with the option of including grips or recessed finger sections (not illustrated) shaped to accommodate an average hand of a person.

Referring now to FIG. 4, a close-up view of a locking mechanism 60, 65 releasably locking a lid 30 onto the upper extremities of a kettle device 20, is disclosed in accordance with the present invention. When the apparatus 10 is in the process of being utilized or not being utilized, it is envisioned that the upper portion of the kettle 20 to be sealably closed via the lid 30 and secured thereon by the hingedly attached locking mechanism 60, 65. When the lid 30 is to be sealably secured to the kettle 20, thereby to seal the contents therewithin said kettle 20, the lid 30 is placed on the upper portion of the kettle 20 and is then pressed downwardly, until gasket 35 sealingly engages around the entire upper extremities of the kettle 20. The lid 30 may now be tightened and locked onto the kettle 20 by utilizing the locking mechanism 60, 65. The locking mechanism 60, 65 comprises a clip 60 pivotally mounted to the lid 30 for releasably engaging and restraining a locking ear 65 attached thereto the upper position of the kettle 20 thereby providing a locking engagement. The clip 60 is rotatably motioned thus resiliently urging the lid 30 downwardly against the upper extremities of the kettle 20. This locking means provides not only for releasable engagement between the kettle 20 and the lid 30, but also restrains movement of said lid 30 relative to the kettle 20, especially during cooking or heating. When the lid 30 is fastened thereon, it compresses the underlying gasket portion 35 thereby sealing said contents therein to be later heated and/or cooked.

Referring now to FIG. 5, an inside view of the apparatus 10, is disclosed in accordance with the present invention. An elongated spout 50 formed thereon the front face of the kettle 20 defines a conduit 55 that resides in interaction with the interior compartment 25 of the kettle 20. As depicted in FIGS. 1 and 5, the spout 50 is integrally contoured and angled thereon the front face to discharge the contents therefrom the kettle 20. The kettle 20 comprises an open front face that leads to a spout 50 by which disintegrates inwardly to regulate a flow of the contents out of said kettle 20. However, the spout 50 is envisioned to comprise a large diameter susceptible to pour even the thickest food and/or fluid to flow therethrough. The spout 50 comprises an interior conduit 55 therein operable to be placed in fluid communication with the interior compartment 25 of the kettle 20. The spout 50 comprises a receiving end 53 that has an open face for receiving contents therefrom the kettle 20 and directs said contents to a spout attachment 70 to disperse outwardly therefrom said kettle 20. As the spout 50 continues from the receiving end 53, it contours upwardly at a desirable angle to direct the flow of contents upwardly in the same fashion. The receiving end 53 of the spout 50 interacts with a dispersing end 52 by means of disintegrating inwardly to regulate a flow of contents thereto the dispersing end 52 of said spout 50. The dispersing end 52 is formed at the opposite end of the receiving end 53 defining a conduit 55 that resides in interaction with the receiving end 53 by means of disintegrating inwardly to regulate a flow of contents thereto a selectable spout attachment 70, 80, 90. Each spout attachment 70, 80, 90 is in direct correspondence with the spout 50 thereby dispersing the receiving contents. Therefore, a flow path is formed communicating with the receiving end 53 of the spout 50 to the dispersing end 52 and finally to each spout attachment 70, 80, 90.

A dispersing end 52 of the spout 50 is envisioned to comprise an inner wall defining a bore for receiving a threaded or grooved region 75 of each spout attachment 70, 80, 90 to secure in place. Each spout attachment 70, 80, 90 comprise an outer wall 72 for receiving and cooperating with the threaded or grooved region 75 of the dispersing end 52. The threaded region 75 of each spout attachment 70, 80, 90 engages the threaded region 75 of the dispersing end 52 thereby disposing each said spout attachment 70, 80, 90 therein the dispersing end 52 of the spout 50. Each spout attachment 70, 80, 90 comprises a different operational task for the user to utilize upon preference. The open front face of the kettle 20 interacts with the receiving end 53 of the spout 50 thereby regulating a flow of the contents thereto each spout attachment 70, 80, 90. Thus, each spout attachment 70, 80, 90 are in fluid communication with the spout 50, and consequently the kettle 20.

Figure 6A:
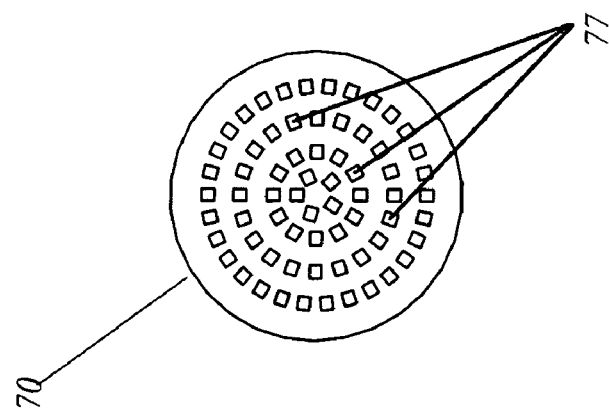

Referring now to FIGS. 6a, 6b, and 6c, front views of a plurality of spout attachments 70, 80, 90, is disclosed in accordance with the present invention. The apparatus 10 is envisioned to comprise a series of interchangeable spout attachments to be utilized in conjunction with the spout arrangement 50. It is envisioned that the spout attachments may be instigated in a plurality of sizes and designs to perform a plurality of functions. For example, a strainer spout attachment 70 comprises a series of apertures 77 or the like therein through which steam may be emitted therefrom the kettle 20 whilst cooking or heating. Another spout attachment 80 may be a straight pour spout with an air induction vent 78 to improve the flow or liquids. Yet another example, a mesh spout attachment 90 comprises means to hold back solids as the cooked product is poured into containers.

The spout attachments 70, 80, 90, when attached thereto the spout 50, are envisioned to be in a parallel arrangement with the longitudinal axis of the dispersing end 52 of the spout 50. The spout attachments 70, 80, 90 may be procured in a variety of sizes and/or configurations. The spout attachments 70, 80, 90 comprise an open back face for receiving contents from the spout 50 to be dispensed therethrough dispersing apertures 77. The dispersing apertures 77 are in direct correspondence with that particular spout attachment thereby dispersing the receiving contents therethrough.

The preferred embodiment of the present invention can be utilized by the common user in a simple and effortless manner with little or no training. The present invention describes a means by which a person can cook jams, jellies, and similar foods in the most efficient manner without the heretofore necessity of other specialized cooking items. After initial purchase or acquisition of the apparatus 10, it would be configured as indicated in FIGS. 1 through 6a, with alternate spout attachments illustrated in FIGS. 6b and 6c.

The method of utilizing the device may be achieved by performing the following steps: putting contents therein the interior compartment 25 of the kettle 20; placing the lid 30 thereon the upper portion of said kettle 20 by grasping the lid handle 40; utilizing the clip 60 to overlap the locking ear 65;

rotatably motioning said clip 60 thereby engaging the clip 60 therewith the locking ear 65; gripping one (1) or more of the handles 45, 46 integrally attached thereto the kettle 20 and/or lid 30; placing the apparatus 10 with the contents therein over a heating medium; once finished heating and/or cooking, removing the apparatus 10 with the contents therein on a surface via the handles 45, 46; selecting a desired spout attachment 70, 80, 90 threadably engaging said selected spout attachment 70, 80, 90 thereto the dispersing end 52 of the spout 50; and, inclining the apparatus 10 at an angle sufficient to allow the contents therein to slowly dispense out of said selected spout attachment 70 80, 90 and, consequently, the kettle 20.

First, with the contents residing therein the interior 25 of the kettle 20, the lid 30 is mounted on said kettle 20 and locked into place via the clip 60 being overlapped and engaging the locking ear 65, by a user in such a manner that steam may exit therethrough the joint between the gasket 35 built around the upper extremities of the kettle 20 and said lid 30. The lid 30 contacts the upper extremities of the kettle 20 and the gasket 35 to provide a continuous grip throughout the entire circumferential border of said upper extremities of said kettle 20. Once the contents therein the kettle 20 has been heated and/or cooked, said contents may then be dispensed therethrough the spout 50 and/or redirected away from the dispensing end 52 of said spout 50 via a spout attachment 70, 80, 90.

The spout 50 is sizeable to collect and divert the contents therein the kettle 20 from the receiving end 53 to a dispersing end 52 in communication with each spout attachment 70, 80, 90 that are optionally mounted thereto. The spout 50 tapers so as to have a reduced diameter thereto the dispersing end 52 whereby there is formed a means to integrally attach each spout attachment 70, 80, 90. Each spout attachment 70, 80, 90 is to threadly attach thereto the dispensing end 52 of the spout 50.

The apparatus 10 is envisioned to be utilized for cooking, straining, and serving so as to provide means of convenience for the user, i.e. eliminating need of transferring hot food from cooking pot to strainer. The apparatus 10 may be used for any cooking from boiling whole meats for broth or a meal to food that requires straining, including, but not limited to: pastas, mashed potatoes, steamed vegetables, creamed soups, refried beans, sauces, and the like. The apparatus 10 permits a user to cook and drain with minimal amount of work and/or handling, while allowing the heat to remain in the pot in the contrary to losing heat by pouring hot food into a strainer in the sink.

Further, the apparatus 10 may be used for any cooking that requires pouring, including, but not limited to, home canning cooking like jellies, jams, and stewed tomatoes. The advantage to the consumer is the easy pour design that allows hot jellies, jams, and sauces to be directly poured into canning jars, eliminating mess and spills.

Various sizes of the kettle 20 would allow from small cooking jobs such as, but not limited to, hot chocolate, sauces, and gravy to large cooking jobs such as, but not limited to, preparing enough marinara sauce and pasta to feed a crowd. Intermediate sizes therebetween are also envisioned for most home cooking. The apparatus 10 may also double as stockpot, but with added function ability if necessary.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A multifunctional cooking kettle for preparing, cooking and storing food, said multifunctional cooking kettle comprising:
    a kettle having an interior compartment provided with an opening formed along an interior sidewall thereof;
    a spout in fluid communication with said opening and extending outwardly from said kettle;
    a plurality of spout attachments selectively and removably affixed to a discharge end of said spout for regulating a discharge rate of the food exiting said kettle;
    a first body handle directly coupled to said kettle and diametrically opposed with said spout system;
    a pair of second body handles directly coupled to said kettle and disposed adjacent to a top edge thereof, said second body handles being diametrically opposed from each other;
    a lid removably connected to said kettle, further comprising an inwardly offset lower shoulder contiguously extending along an annular travel path defined interior of an outer perimeter of said lid, said lid including a rubber gasket directly coupled to said lower shoulder and covering an entire surface area thereof such that said rubber gasket directly abuts against a top edge of said interior compartment when said lid is attached to said kettle; and,
    a locking device attached to said lid and said kettle for maintaining said lid at a substantially stable position while attached to said kettle during cooking operations, further comprising:
        a clip pivotally mounted to said lid; and,
        a locking ear directly and statically attached to said top edge in such a manner that said locking ear is releasably engaged with said clip and thereby maintains said lid and said kettle statically connected to each other;
        wherein said clip is rotatably motioned and thereby resiliently urges said lid downwardly against said top edge of said kettle.

2. The multifunctional cooking kettle of claim 1, wherein a first one of said spout attachments is provided with a plurality of concentrically formed openings equidistantly juxtaposed within a circumference of said first spout attachment.

3. The multifunctional cooking kettle of claim 1, wherein a second one of said spout attachments is provided with an air induction vent and a discharge opening proximately disposed thereagainst.

4. The multifunctional cooking kettle of claim 1, wherein a third one of said spout attachments is provided with a mesh screen covering a major surface area of said third spout attachment.

5. A multifunctional cooking kettle for preparing, cooking and storing food, said multifunctional cooking kettle comprising:
    a generally cylindrical kettle having an interior compartment provided with an opening formed along an interior sidewall thereof;

a spout in fluid communication with said opening and extending outwardly from said kettle, said spout converging distally away from said kettle;

a plurality of spout attachments selectively and threadably affixed to a discharge end of said spout for regulating a discharge rate of the food exiting said kettle;

a first body handle directly coupled to said kettle and diametrically opposed with said spout system;

a pair of second body handles directly coupled to said kettle and disposed adjacent to a top edge thereof, said second body handles being diametrically opposed from each other;

a lid removably connected to said kettle, further comprising includes an inwardly offset lower shoulder contiguously extending along an annular travel path defined interior of an outer perimeter of said lid, said lid including a rubber gasket directly coupled to said lower shoulder and covering an entire surface area thereof such that said rubber gasket directly abuts against a top edge of said interior compartment when said lid is attached to said kettle; and, a locking device attached to said lid and said kettle for maintaining said lid at a substantially stable position while attached to said kettle during cooking operations, further comprising:

a clip pivotally mounted to said lid; and, a locking ear directly and statically attached to said top edge in such a manner that said locking ear is releasably engaged with said clip and thereby maintains said lid and said kettle statically connected to each other;

wherein said clip is rotatably motioned and thereby resiliently urges said lid downwardly against said top edge of said kettle.

6. The multifunctional cooking kettle of claim 5, wherein a first one of said spout attachments is provided with a plurality of concentrically formed openings equidistantly juxtaposed within a circumference of said first spout attachment.

7. The multifunctional cooking kettle of claim 5, wherein a second one of said spout attachments is provided with an air induction vent and a discharge opening proximately disposed thereagainst.

8. The multifunctional cooking kettle of claim 5, wherein a third one of said spout attachments is provided with a mesh screen covering a major surface area of said third spout attachment.

* * * * *